Dec. 2, 1930.  E. H. FALK  1,783,781
AIR PREHEATER FOR MANIFOLDS
Filed Oct. 22, 1929
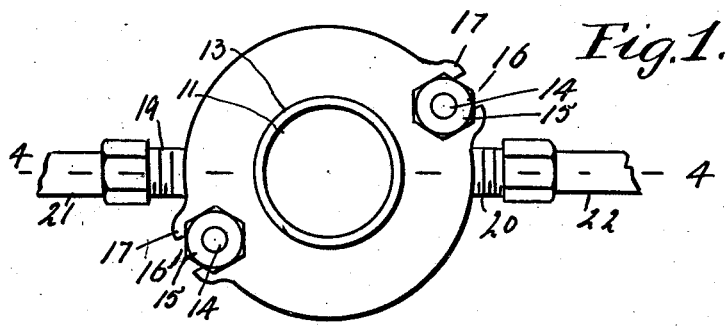
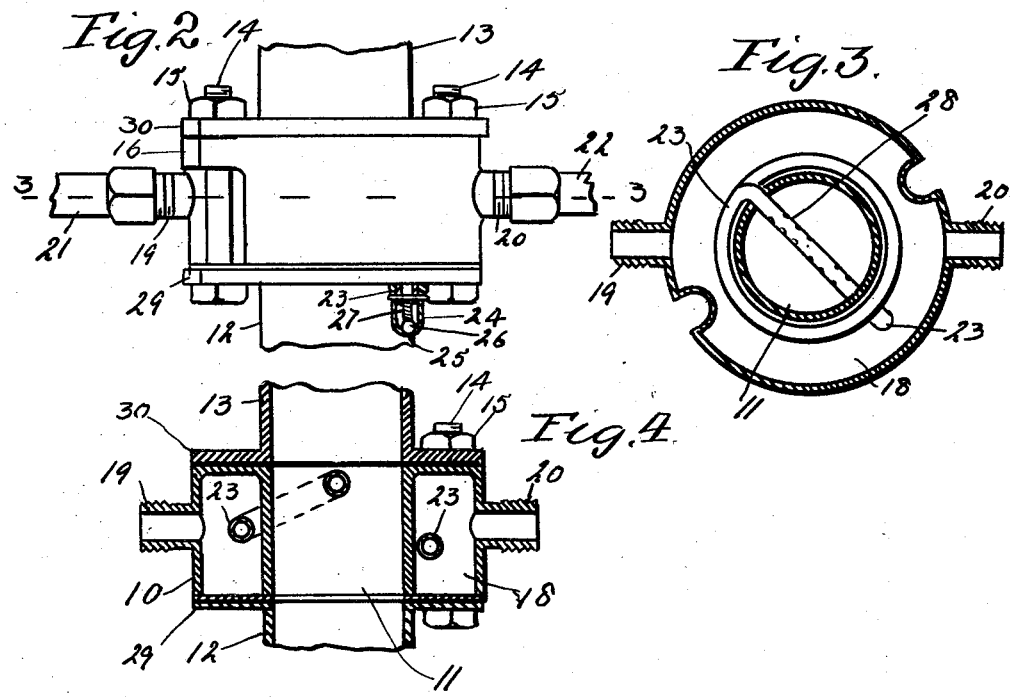
Inventor
Edward H Falk
By
Atty.

Patented Dec. 2, 1930

1,783,781

UNITED STATES PATENT OFFICE

EDWARD H. FALK, OF PHILADELPHIA, PENNSYLVANIA

AIR PREHEATER FOR MANIFOLDS

Application filed October 22, 1929. Serial No. 401,443.

My invention relates to new and useful improvements in air preheaters for manifolds and has for its object to provide an exceedingly simple and effective device of this description in which the hot water from the circulating system of an internal combustion engine will be utilized for heating the air delivered to the intake of the manifold.

A further object of the invention is to so coil and place an air pipe within the device that the air will be readily delivered therethrough, heated therein and sprayed into the gas inflowing into the manifold.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1, is a plan view of a preheater made in accordance with my improvements.

Fig. 2, is a side elevation of Fig. 1.

Fig. 3, is a section at the line 3—3 of Fig. 2.

Fig. 4, is a section at the line 4—4 of Fig. 1.

In carrying out my invention as herein embodied, 10 represents the casing of the preheater, said casing having a central opening 11 for registering with the outlet 12 of the carburetor and the intake 13 of the manifold when the device is coupled in place. This casing is held in place by the bolts 14 on which the nuts 15 are threaded, said bolts passing through the slots 16 in the ears 17. Within the casing 10 and around the opening 11 is formed an annular space or chamber 18 and cast with the casing are the nipples 19 and 20 through which communication is had to the chamber 18. The nipple 19 is connected through the pipe 21 to the water circulating system at or near the bottom thereof while the nipple 20 is connected through the pipe 22 to the same circulating system at or near the top thereof, thus when the water in this system is heated in the process of cooling the engine, a portion of said water will flow through the pipes 20 and 22 and thus circulate within the chamber 18 and as this water becomes highly heated as it does in practice, the walls of the opening 11 will become heated therefrom and this heat will be more or less transmitted through the gas passing through said opening 11.

23 represents a pipe which is coiled around the wall of the opening 11 and positioned within the chamber 18, the lower end of said pipe having a thimble 24 threaded thereon, said thimble having a small opening 25 in the bottom thereof over which is seated the check ball 26 normally held in place by the spring 27. The upper end of this pipe passes through the wall of the opening 11 and extends horizontally across said opening as clearly illustrated in Fig. 3.

The horizontal section of this pipe has a series of small openings 28 formed therein so that air issuing from this pipe through these openings will be in the form of fine sprays facilitating its co-mingling with the gas flowing from the carburetor to the intake.

The pipe 23 being coiled within the chamber 18 absorbs the heat from the hot water circulating through said chamber and transmits this heat to the air flowing through the coils of this pipe, vaporizing any moisture in the air, thus further adding heat to the fuel in its passage from the carburetor to the manifold thereby increasing power value of said fuel.

29 represents the usual flange on the carburetor while 30 represents the corresponding flange on the intake 13 and the casing 10 is of such shape and proportions as to conform with these flanges so that the bolts 14 with their nuts 15 may readily secure the device in position between the carburetor and intake.

From the foregoing description the operation of my improvement will be obviously as follows:—

The functioning of the engine drawing gas from the carburetor to the manifold will cause said gas to flow through the opening or passageway 11 under the influence of a partial vacuum and this partial vacuum will suck air through small openings 28 in the horizontal section of the pipe 23 thereby opening the check valve 34 and permitting a free inflow of air to the coil pipe 23. This takes place at every impulse in the intake due to the cylinders of the engine drawing in fuel and this preheated air will raise the temperature of the inflowing fuel, the temperature of said fuel being further raised by heat absorbed from the wall of the passageway 11, and it has been found in practice that this increases the efficiency of the engine to a considerable degree.

Of course I do not wish to be limited to the exact details of construction as herein shown, as these may be varied within the limits of the appended claims without departing from the spirit of my invention.

Having thus fully described my invention, what I claim as new and useful is:—

1. In an air preheater for manifolds, a casing having a passageway therethrough, the wall of said passageway forming a chamber within said casing, a pipe coiled within said chamber around the wall of said passageway, said pipe having a horizontal section which passes through said wall and extends across the passageway, said horizontal section having a series of small openings therein for the passage of air, one end of said pipe communicating with the atmosphere through the bottom wall of the casing, a spring actuated check valve for permitting the inflow of air to said pipe but preventing the flow in a reverse direction and means for connecting the interior of the casing with the lower portion of the water circulating system of an internal combustion engine and the upper portion of said circulating system.

2. In a device of the character described, a casing having a chamber therein, the inner walls of said chamber forming a passageway through which the gas from the carburetor to the intake of an internal combustion engine may pass, means for securing the casing between the carburetor and the intake so as to form a continuous passage for the gas from the carburetor to the intake, a nipple through which communication may be had from the lower portion of the water circulating system of the engine to the chamber within the casing, a nipple through which communication may be had from the chamber in the casing to the upper portion of said circulating system, and a pipe coiled around the wall of a passageway in the casing, one end of which communicates with the atmosphere through a spring controlled check valve while the other end of said pipe passes through the wall of the passageway and extends horizontally across said passageway, a series of holes being formed in said horizontal section.

3. In a device of the character described, a casing adapted to be secured between the carburetor and intake of the manifold of an internal combustion engine, a passageway through said casing forming a communication between the carburetor and the intake, means for circulating the heated water of the cooling system of said engine within said casing, a pipe coiled within the casing and adapted to absorb the heat from said circulating water and vaporized any moisture in the air, means for admitting air to said pipe and checking the outflow thereof, and an extension of side pipe projecting into the passageway of the casing, said extension having a series of openings therein for the admission of air in fine jets to the fuel passing through said passageway.

In testimony whereof, I have hereunto affixed my signature.

EDWARD H. FALK.